(12) United States Patent  
Zuo

(10) Patent No.: US 11,143,908 B2  
(45) Date of Patent: Oct. 12, 2021

(54) LIQUID CRYSTAL DISPLAY DEVICE AND BACKLIGHT CONTROL METHOD THEREOF

(71) Applicant: Wuhan China Star Optoelectronics Technology Co., Ltd., Wuhan (CN)

(72) Inventor: Qingcheng Zuo, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 103 days.

(21) Appl. No.: 16/493,329

(22) PCT Filed: Apr. 9, 2019

(86) PCT No.: PCT/CN2019/081838  
§ 371 (c)(1),  
(2) Date: Sep. 12, 2019

(87) PCT Pub. No.: WO2020/087870  
PCT Pub. Date: May 7, 2020

(65) Prior Publication Data  
US 2020/0233264 A1    Jul. 23, 2020

(51) Int. Cl.  
*G02F 1/13357* (2006.01)  
*G09G 3/34* (2006.01)

(52) U.S. Cl.  
CPC ..... *G02F 1/133602* (2013.01); *G09G 3/3406* (2013.01); *G09G 2320/0646* (2013.01)

(58) Field of Classification Search  
CPC .......... G09G 3/3406; G09G 2320/0646; G02F 1/133602  
See application file for complete search history.

(56) References Cited

U.S. PATENT DOCUMENTS

| | | | | |
|---|---|---|---|---|
| 7,701,475 | B2 * | 4/2010 | Aoki .................... | G09G 3/2096 345/690 |
| 8,976,192 | B2 * | 3/2015 | Huang ................. | G09G 3/3406 345/600 |
| 2003/0085905 | A1 * | 5/2003 | Mori ........................ | G09G 5/10 345/589 |
| 2006/0279564 | A1 * | 12/2006 | Nuimura .............. | H04N 9/3182 345/207 |
| 2008/0100554 | A1 * | 5/2008 | Mori ...................... | G09G 5/003 345/89 |
| 2008/0150853 | A1 * | 6/2008 | Peng .................... | G09G 3/3426 345/87 |
| 2008/0180373 | A1 * | 7/2008 | Mori .................... | G09G 3/3406 345/89 |

(Continued)

*Primary Examiner* — Sejoon Ahn

(57) ABSTRACT

A liquid crystal display device and a backlight control method thereof are provided. In response to that average pixel brightness of image data is less than a threshold, a first backlight driving signal is generated based on gray level information of the image data and a second backlight driving signal is generated based on saturation information of the image data. A convolution operation is performed on the first and the second backlight driving signal to output a backlight driving signal. The backlight driving signal is modulated and provided to a backlight module for producing backlight to a liquid crystal panel. Power consumption of the backlight module is lowered and meanwhile a dark effect caused in displaying images of a pure color is improved.

11 Claims, 4 Drawing Sheets

(56) References Cited

U.S. PATENT DOCUMENTS

| | | | | |
|---|---|---|---|---|
| 2008/0186413 A1* | 8/2008 | Someya | .................... | H04N 9/68 |
| | | | | 348/739 |
| 2009/0022395 A1* | 1/2009 | Cho | ......................... | G09G 5/06 |
| | | | | 382/167 |
| 2009/0059078 A1* | 3/2009 | Kim | ..................... | G09G 3/3607 |
| | | | | 348/645 |
| 2009/0284545 A1* | 11/2009 | Watanabe | ............ | G09G 3/3611 |
| | | | | 345/589 |
| 2012/0044277 A1* | 2/2012 | Adachi | ................ | G09G 3/3426 |
| | | | | 345/690 |
| 2013/0335457 A1* | 12/2013 | Yano | ..................... | G09G 3/3208 |
| | | | | 345/690 |
| 2013/0342587 A1* | 12/2013 | Nakagawa | ............ | G09G 3/3208 |
| | | | | 345/690 |
| 2015/0348506 A1* | 12/2015 | Ooga | ....................... | G09G 5/02 |
| | | | | 345/205 |
| 2016/0283013 A1* | 9/2016 | Engstrom | ......... | G06F 3/041662 |
| 2016/0284279 A1* | 9/2016 | Li | ......................... | G09G 3/3406 |
| 2016/0284281 A1* | 9/2016 | Suyama | ............... | G09G 3/3406 |
| 2017/0110071 A1* | 4/2017 | Ando | ..................... | G09G 3/3607 |
| 2018/0247581 A1* | 8/2018 | Sakurai | ................ | G09G 3/3426 |
| 2018/0247609 A1* | 8/2018 | Joshi | .................... | G09G 3/3426 |

* cited by examiner

LIQUID CRYSTAL DISPLAY DEVICE AND BACKLIGHT CONTROL METHOD THEREOF

RELATED APPLICATIONS

This application is a National Phase of PCT Patent Application No. PCT/CN2019/081838 having International filing date of Apr. 9, 2019, which claims the benefit of priority of Chinese Patent Application No. 201811278852.1 filed on Oct. 30, 2018. The contents of the above applications are all incorporated by reference as if fully set forth herein in their entirety.

FIELD AND BACKGROUND OF THE INVENTION

The present disclosure relates to liquid crystal display technologies, and more particularly, to a liquid crystal display device and a backlight control method thereof.

With the development of electro-optical and semiconductor technologies, the development of flat panel displays is promoted. In various types of flat panel displays, liquid crystal displays (LCDs) have been applied to various aspects of human lives owing to its superior characteristics of high space utilization efficiency, low power consumption, radiation free, and low electromagnetic interference, and so on.

Currently, smart terminals such as mobile phones, tablet computers, and etc. basically adopt the LCDs as their display screens. In an existing smart terminal, power consumption of the LCD serving as the display screen occupies 60 to 70 percent of entire power consumption of the terminal. In the LCD, backlight power consumption occupies 70 to 80 percent of entire power consumption of the LCD. Accordingly, how to control the backlight power consumption becomes a common goal in the industry.

By efforts made by researchers and technology workers, a backlight power saving technology mainly for LCDs is proposed, that is, a content adaptive brightness control (CABC) technology, which can adjust relation between gray level brightness of an image and backlight brightness based on a display image, and basically keep the effect in displaying image and meanwhile lower the backlight brightness effectively.

However, in image displaying technologies, people gradually use a RGBW system to replace a RGB system since the RGB system has low color mixing efficiency, and gets poor color rendering property for mixed white light. The RGBW system includes not only red subpixels, green subpixels, and blue subpixels but also brightness enhancing pixels (i.e., white subpixels), and thus is able to carry out all of the functions that can be achieved by the RGB system. Also, the RGBW system has advantages of high luminous efficiency and relatively high color rendering property. Since the white subpixels are added in the RGBW system, saturation for pure color in the image may become worse. In a case that a background is displayed on a RGBW display, the white subpixels makes the brightness of the background greater than the brightness of the background displayed on a RGB display. Accordingly, pure color included in the background displayed on the RGBW display may appear relatively dark, that is, pure color brightness become worse relatively. Compared to the RGB display, pure color saturation for the RGBW display become worse because of poor relative brightness.

To solve the problem of dark pure color in the RGBW display, related researchers provide a saturation adaptive brightness control (SABC) based on the content adaptive brightness control technology, thereby achieving improvements on display quality. Specifically, after analysis by a gray level analyzing module and a saturation analyzing module, gray level brightness and saturation of an image are detected and convolutional results of the two are obtained to solve the problem of dark pure color by controlling pulse width modulation (PWM) duty cycle of a backlight module. However, this limits to gray levels of unsaturated parts.

Furthermore, human eyes are sensitive to bright and dark for different densities of light rays. Rod cells are columnar, are more sensitive to moving objects, and are highly sensitive to dim light but are not sensitive to color, intense light, and details of objects. The rod cells belong to an organ for scotopic vision. Cone cells are conical, are dedicated to be sensitive to intense light and color, and can differentiate details of objects. The cone cells belong to an organ for photopic vision. Under low gray levels, the rod cells of the human eye work for the most part and the cone cells sensitive to saturation work less. In this situation, saturation analysis appears to be not important. It may cause a waste of power consumption if a large amount of data analysis is done.

SUMMARY OF THE INVENTION

The objective of the present invention is to provide a liquid crystal display device and a backlight control method thereof, which is capable of lowering power consumption of a liquid crystal module (especially the backlight module 50) of the liquid crystal display device and meanwhile ensuring that a dark effect caused in displaying images of a pure color by the liquid crystal display device is improved.

In an aspect, the present invention provides a liquid crystal display device. The liquid crystal display device includes an image data obtaining module, a liquid crystal panel, a panel driving module, a backlight module, and a backlight driving module, the image data obtaining module including a gray level analyzing module and a saturation analyzing module, the image data obtaining module configured to obtain image data; the gray level analyzing module configured to detect and calculate average pixel brightness of the image data and compare the average pixel brightness with a gray level threshold set in the gray level analyzing module; in response to that the average pixel brightness is less than the gray level threshold, the panel driving module is allowed to connect to the gray level analyzing module and the saturation analyzing module, the panel driving module drives the liquid crystal panel based on the image data, generates a first backlight driving signal and a second backlight driving signal based on the image data, and performs a convolution operation on the first backlight driving signal and the second backlight driving signal by using a convolution operating module to output a backlight driving signal; in response to that the average pixel brightness is greater than or equal to the gray level threshold, the panel driving module is allowed to connect to the gray level analyzing module, the panel driving module drives the liquid crystal panel based on the image data, generates a first backlight driving signal, and serves the first backlight driving signal as a backlight driving signal to output the same; The backlight driving module including a pulse width modulation module configured to modulate the backlight driving signal during a display period to form a power supplier for being provided to the backlight module.

In an embodiment of the present invention, the gray level analyzing module includes an average pixel brightness detecting module and a pixel brightness comparing module, the average pixel brightness detecting module is configured to detect and calculate the average pixel brightness of the image data, the pixel brightness comparing module is configured to store the gray level threshold and compare the average pixel brightness with the gray level threshold.

In an embodiment of the present invention, the average pixel brightness detecting module is configured to obtain the image data and calculate based on gray level histogram analysis to obtain an average pixel brightness.

In an embodiment of the present invention, the gray level analyzing module is further configured to obtain gray level information based on the image data and transmit the gray level information to the panel driving module, the panel driving module generates a first backlight driving signal based on the gray level information.

In an embodiment of the present invention, the saturation analyzing module is configured to obtain saturation information based on the image data and transmit the saturation information to the panel driving module, the panel driving module generates a second backlight driving signal based on the saturation information.

In an embodiment of the present invention, the convolution operating module is disposed in the panel driving module.

In an embodiment of the present invention, the liquid crystal display device further includes a gating switch configured to receive the backlight driving signal, and allow to output the backlight driving signal or forbid to output the backlight driving signal based on an external value received by the gating switch.

In an embodiment of the present invention, the liquid crystal display device further includes a fuzzy module configured to adjust the backlight driving signal such that backlight brightness of the liquid crystal display gradually changes to a final backlight brightness value.

In an embodiment of the present invention, the panel driving module is configured to receive the image data from the image data obtaining module, and increase gray level brightness and saturation of the image data based on a ratio to drive the liquid crystal panel or increase gray level brightness of the image data based on the ratio to drive the liquid crystal panel, and the panel driving module is further configured to generate the backlight driving signal based on a condition that the backlight module decreases the backlight brightness based on the ratio.

In another aspect, the present invention provides a backlight control method according to the afore-described liquid crystal display device. The backlight control method includes steps of: (a) utilizing the gray level analyzing module to detect and calculate average pixel brightness of the image data and compare the average pixel brightness with a gray level threshold; (b) in response to that the average pixel brightness is less than the gray level threshold, utilizing the panel driving module to connect to the gray level analyzing module and the saturation analyzing module and generate a first backlight driving signal and a second backlight driving signal; (c) performing a convolution operation on the first backlight driving signal and the second backlight driving signal to output a backlight driving signal and turning to Step (e); (d) in response to that the average pixel brightness is greater than or equal to the gray level threshold, utilizing the panel driving module to connect to the gray level analyzing module, and generate a first backlight driving signal and output the first backlight driving signal as a backlight driving signal; (e) forming a power supplier for being provided to the backlight module by modulating the backlight driving signal.

In an embodiment of the present invention, the gray level analyzing module includes an average pixel brightness detecting module and a pixel brightness comparing module, and wherein in Step (a), the image data is obtained by the average pixel brightness detecting module and the average pixel brightness is calculated and obtained by gray level histogram analysis.

In an embodiment of the present invention, the panel driving module receives the image data from the image data obtaining module, and increases gray level brightness and saturation of the image data based on a ratio to drive the liquid crystal panel or increase gray level brightness of the image data based on the ratio to drive the liquid crystal panel, and the panel driving module generates the backlight driving signal based on a condition that the backlight module decreases the backlight brightness based on the ratio.

In an embodiment of the present invention, the ratio is preset and written to the panel driving module by using a register.

Advantages of the present invention are described below. The liquid crystal display device and the backlight control method thereof of the present invention can lower power consumption of a liquid crystal module (especially the backlight module) of the liquid crystal display device and meanwhile ensure that a dark effect caused in displaying images of a pure color by the liquid crystal display device is improved.

BRIEF DESCRIPTION OF THE SEVERAL VIEWS OF THE DRAWINGS

To illustrate the technical solutions in the embodiments of the present invention more clearly, the following briefly introduces the accompanying drawings required for describing the embodiments of the present invention. Apparently, the accompanying drawings in the following description show some embodiments of the present invention, and a person of ordinary skill in the art may still derive other drawings from these accompanying drawings without creative efforts.

DESCRIPTION OF SPECIFIC EMBODIMENTS OF THE INVENTION

Figure 1:
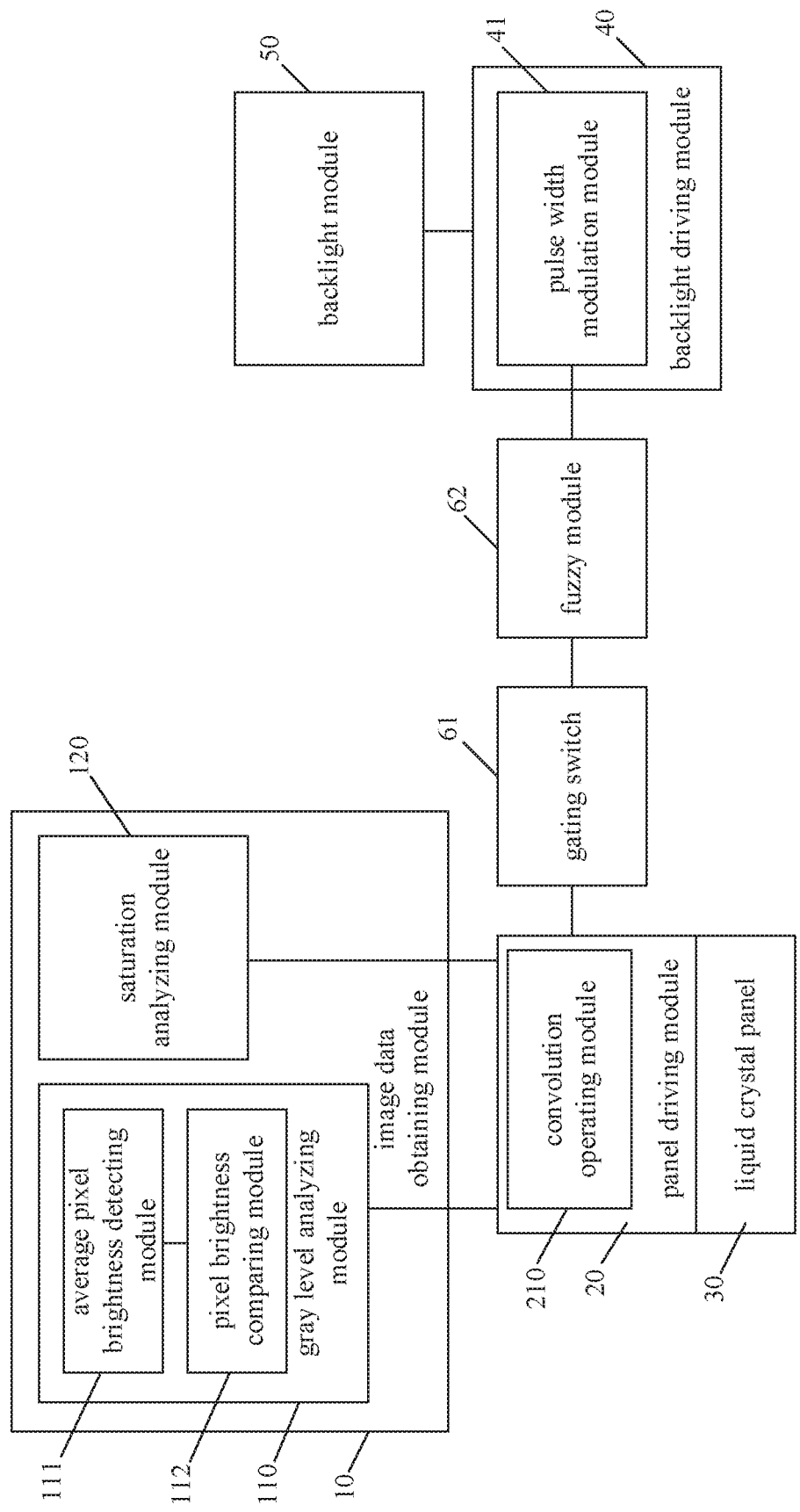
FIG. 1 is a structural diagram of a liquid crystal display device in accordance with an embodiment of the present invention.

The technical solutions in the embodiments of the present invention will be clearly and completely described below with reference to the accompanying drawings of the embodiments of the present invention. Obviously, the embodiments described herein are a part rather than all of the embodiments of the present invention. All other embodiments obtained by a person of ordinary skill in the art based on the embodiments of the present invention without creative efforts shall fall within the scope of the present invention.

The terms "first", "second", "third", and etc. (if exist) in the specification, claims and aforesaid drawings of the present invention are used for distinguishing similar objects but not for describing the specific sequence or order. It should be understood that the objects described in such way can be interchanged in appropriate situations. Additionally, terms such as "comprising" and "having" as well as any of their deformation is intended to cover non-exclusive inclusion.

In the present patent document, the drawings and the embodiments for describing principles of the present invention in the following text are merely used for illustration, and should not be construed as a limit to the scope of the present invention. A person of ordinary skill in the art will understood that the principles of the present invention can be implemented in any of appropriately deployed systems. Exemplary embodiments will be described in detail. Instances for these embodiments are shown in the drawings. In addition, terminals will be described in detail based on exemplary embodiments with reference to the drawings. Same reference numbers in the drawings refer to same elements.

The terminology used herein is for the purpose of describing particular embodiments only and is not intended to be limiting of the invention. Singular forms are intended to include the plural forms, unless the context clearly indicates otherwise. It will be understood that the terms "comprises," "has", and "includes" in the specification of the present invention specify the presence of stated features, integers, steps, operations, or their combinations disclosed in the specification of the present invention, but do not preclude the presence or addition of one or more other features, integers, steps, operations, or their combinations. Same reference numbers in the drawings refer to same elements.

Embodiments of the present invention provide a liquid crystal display device and a backlight control method thereof. It will be separately described detailedly in the following.

Figure 2A:
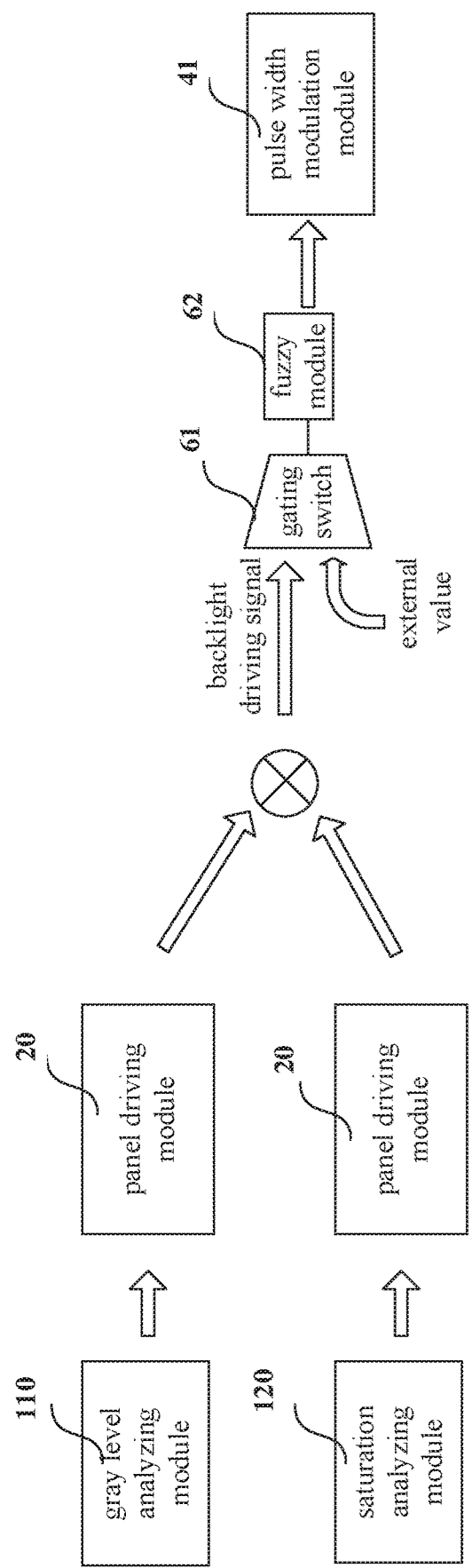
FIGS. 2A and 2B are schematic diagrams showing relations between a gray level analyzing module, a saturation analyzing module, a panel driving module, a gating switch, and a fuzzy module of the liquid crystal display device of the present invention respectively when average pixel brightness is less than a gray level threshold and when the average pixel brightness is greater than or equal to the gray level threshold.
Figure 2B:
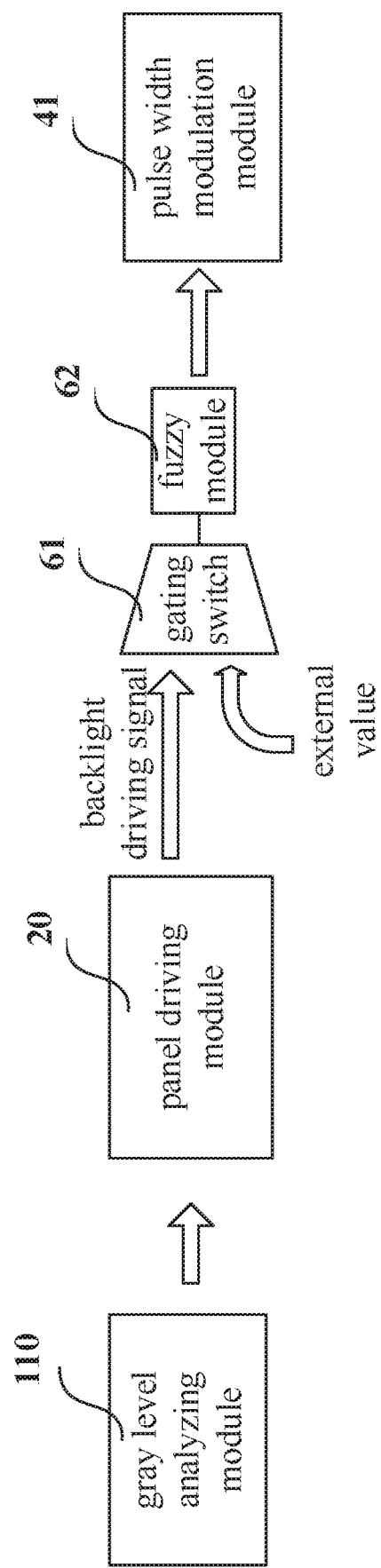

Referring to FIGS. 1 to 2B, a liquid crystal display device is provided in an embodiment of the present invention. The liquid crystal display device includes an image data obtaining module 10, a liquid crystal panel 30, a panel driving module 20, a backlight module 50, and a backlight driving module 40.

The image data obtaining module 10 includes a gray level analyzing module 110 and a saturation analyzing module 120. Of course, in other embodiments, the gray level analyzing module 110 and the saturation analyzing module 120 can also be disposed in other modules of the liquid crystal display device or be directly disposed in the liquid crystal display device. The image data obtaining module 10 is configured to obtain image data.

Specifically, the gray level analyzing module 110 obtains gray level information based on the image data and transmits the gray level information to the panel driving module 20. The saturation analyzing module 120 obtains saturation information based on the image data and transmits the saturation information to the panel driving module 20. The image data can be obtained using the gray level analyzing module 110 and the saturation analyzing module 120. It may also obtain the image data using other modules of the image data obtaining module 10.

The gray level analyzing module 110 is configured to detect and calculate average pixel brightness or average picture level (APL) of the image data and compare the average pixel brightness with a gray level threshold set in the gray level analyzing module 110 In the present embodiment, the gray level analyzing module 110 includes an average pixel brightness detecting module 111 and a pixel brightness comparing module 112. The average pixel brightness detecting module 111 is configured to obtain the image data and calculate based on gray level histogram analysis to obtain the average pixel brightness. The pixel brightness comparing module 112 is configured to store the gray level threshold and compare the average pixel brightness with the gray level threshold. The average pixel brightness is determined based on gray levels and pixel numbers of a display screen.

When the average pixel brightness is less than the gray level threshold, the panel driving module 20 is allowed to connect to the gray level analyzing module 110 and the saturation analyzing module 120 and. The panel driving module 20 drives the liquid crystal panel 30 based on the image data and generates a first backlight driving signal and a second backlight driving signal based on the image data. Specifically, the panel driving module 20 generates a first backlight driving signal based on the gray level information. Likewise, the panel driving module 20 generates a second backlight driving signal based on the saturation information. Also, when the panel driving module 20 generates the first backlight driving signal and the second backlight driving signal, a convolution operation may be performed on the first backlight driving signal and the second backlight driving signal using a convolution operating module 210 disposed in the panel driving module 20 to output a backlight driving signal. Of course, the convolution operating module 210 can also be disposed in other modules of the liquid crystal display device. The convolution operation is a mathematical operation well known by an ordinary person in the art, and will not be detailed herein.

When the average pixel brightness is greater than or equal to the gray level threshold, the panel driving module 20 is allowed to connect to the gray level analyzing module 110. The panel driving module 20 drives the liquid crystal panel 30 based on the image data, generates a first backlight driving signal, and serves the first backlight driving signal as a backlight driving signal to output the same.

In addition, a first duty cycle is correspondingly obtained based on the first backlight driving signal. The first duty cycle affects the size of current driving LEDs in the backlight module 50, thereby affecting backlight brightness and backlight power consumption.

Likewise, a second duty cycle is correspondingly obtained based on the second backlight driving signal. The second duty cycle affects the size of current driving LEDs in the backlight module 50, thereby affecting backlight brightness and backlight power consumption. The second duty cycle is large when the saturation is large; the second duty cycle is small when the saturation is small.

In addition, a first gain will be correspondingly generated when the first backlight driving signal is generated. Likewise, a second gain will be correspondingly generated when the second backlight driving signal is generated. The first gain and the second gain provide related data for compensating the backlight brightness of the liquid crystal display.

In the present embodiment, the panel driving module 20 receives the image data from the image data obtaining module 10. The panel driving module 20 may obtain the image data from the gray level analyzing module 110 and the saturation analyzing module 120 of the image data obtaining module 10. It may also obtain the image data using other modules of the image data obtaining module 10. When the average pixel brightness is less than the gray level threshold, the gray level brightness and saturation of the image data increase based on a ratio to drive the liquid crystal panel 30. Alternatively, when the average pixel brightness is greater than or equal to the gray level threshold, the gray level brightness of the image data increases based on the ratio to drive the liquid crystal panel 30. The panel driving module 20 is further configured to generate the backlight driving signal based on a condition that the backlight module 50 decreases the backlight brightness based on the ratio.

Optionally, in the present embodiment, the liquid crystal display device further includes a gating switch 61 configured to receive the backlight driving signal, and allow to output the backlight driving signal or forbid to output the backlight driving signal based on an external value received by the gating switch 61. That is, for example, if the external value is 1, it allows to output the backlight driving signal. If the external value is 0, it forbids to output the backlight driving signal.

Optionally, the liquid crystal display device further includes a fuzzy module 62 configured to adjust the backlight driving signal such that backlight brightness of the liquid crystal display gradually changes to a final backlight brightness value. By deploying the fuzzy module 62, the backlight brightness can change gradually. This avoids bringing uncomfortable feelings to human eyes due to sudden brightness variation.

The backlight driving module 40 includes a pulse width modulation module 41 configured to modulate the backlight driving signal during a display period to form a power supplier for being provided to the backlight module 50. Accordingly, the backlight module 50 generates light rays with corresponding brightness and provides them to the liquid crystal panel 30. The liquid crystal panel 30 displays images.

In the present embodiment, when the average pixel brightness is less than the gray level threshold, the panel driving module 20 transforms the generated first backlight driving signal and the second backlight driving signal into the final backlight driving signal by the convolution operation. Then, the final backlight driving signal is modulated by the pulse width modulation module 41.

Figure 3:
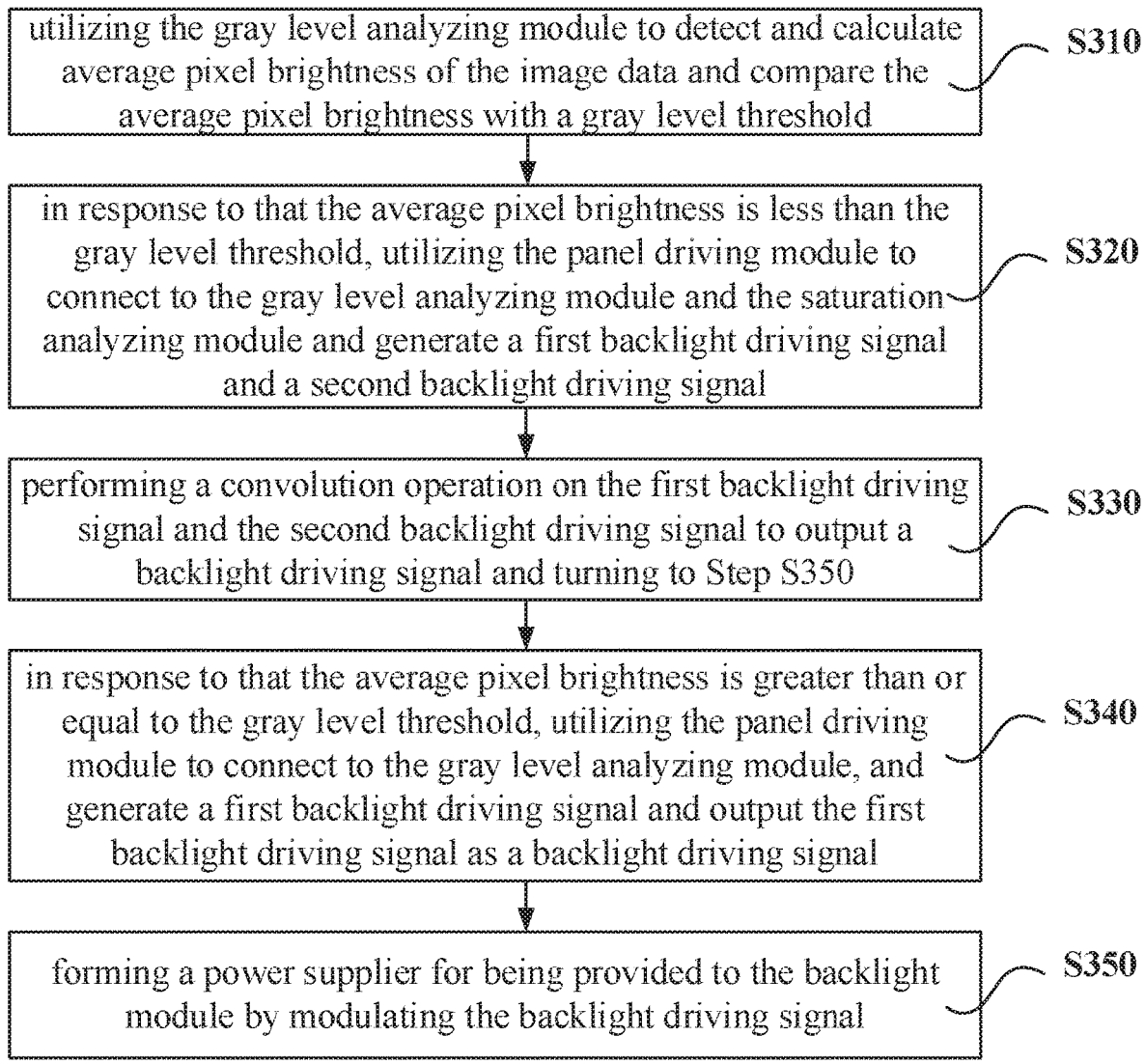
FIG. 3 is a flowchart of a backlight control method for a liquid crystal display device in accordance with an embodiment of the present invention.

Referring to FIG. 3, in an embodiment of the present invention, the present invention provides a backlight control method for a liquid crystal display device. The liquid crystal display device includes an image data obtaining module 10, a liquid crystal panel 30, a panel driving module 20, a backlight module 50, and a backlight driving module 40. The image data obtaining module 10 includes a gray level analyzing module 110 and a saturation analyzing module 120. The backlight driving module 40 includes a pulse width modulation module 41. The structures, relative positions, and functions of the modules of the liquid crystal display device may refer to the liquid crystal display device described in above context, and are not repeated herein.

The backlight control method includes the following steps.

Step S310—utilizing the gray level analyzing module to detect and calculate average pixel brightness of the image data and compare the average pixel brightness with a gray level threshold.

The gray level analyzing module 110 includes an average pixel brightness detecting module 111 and a pixel brightness comparing module 112. The image data is obtained by the average pixel brightness detecting module 111 and the average pixel brightness is obtained by calculation based on gray level histogram analysis.

Step S320—in response to that the average pixel brightness is less than the gray level threshold, utilizing the panel driving module to connect to the gray level analyzing module and the saturation analyzing module and generate a first backlight driving signal and a second backlight driving signal.

Step S330—performing a convolution operation on the first backlight driving signal and the second backlight driving signal to output a backlight driving signal and turning to Step S350.

Step S340—in response to that the average pixel brightness is greater than or equal to the gray level threshold, utilizing the panel driving module to connect to the gray level analyzing module, and generate a first backlight driving signal and output the first backlight driving signal as a backlight driving signal.

In Step S330 or S340, the panel driving module 20 receives the image data from the image data obtaining module 10. When the average pixel brightness is less than the gray level threshold, the gray level brightness and saturation of the image data increase based on a ratio to drive the liquid crystal panel 30. Alternatively, when the average pixel brightness is greater than or equal to the gray level threshold, the gray level brightness of the image data increases based on the ratio to drive the liquid crystal panel 30. The ratio is preset and written to the panel driving module 20 by using a register.

In addition, the panel driving module 20 generates the backlight driving signal based on a condition that the backlight module 50 decreases the backlight brightness based on the ratio.

Step S350—forming a power supplier for being provided to the backlight module by modulating the backlight driving signal.

The liquid crystal display device and the backlight control method thereof of the present invention can lower power consumption of a liquid crystal module (especially the backlight module 50) of the liquid crystal display device and meanwhile ensure that a dark effect caused in displaying images of a pure color by the liquid crystal display device is improved.

Above descriptions are preferred embodiments of the present invention. It should be noted that various modifications and alterations can be made by persons skilled in this art without departing from the principles of the present invention, and that all modifications and alterations are within the scope of the present invention.

The subject matter of the present application can be manufactured and used in industries and thus complies with industrial utility.

What is claimed is:

1. A liquid crystal display device, comprising a liquid crystal panel and a backlight module providing backlight to the liquid crystal panel, the liquid crystal display device further comprising:

an image data obtaining module comprising a gray level analyzing module and a saturation analyzing module, the image data obtaining module configured to obtain image data, the gray level analyzing module configured to detect and calculate average pixel brightness of the image data and compare the average pixel brightness with a gray level threshold set in the gray level analyzing module, wherein the gray level analyzing module is configured to obtain gray level information based on the image data and transmit the gray level information to a panel driving module, wherein the saturation analyzing module is configured to obtain saturation information based on the image data and transmit the saturation information to the panel driving module;

the panel driving module, configured to be allowed to connect to the gray level analyzing module and the saturation analyzing module in response to that the average pixel brightness is less than the gray level threshold, the panel driving module driving the liquid crystal panel based on the image data, generating a first backlight driving signal based on the gray level information of the image data and a second backlight driving signal based on the saturation information of the image data, and performing a convolution operation on the first backlight driving signal and the second backlight driving signal by using a convolution operating module to output a backlight driving signal; and configured to be allowed to connect to the gray level analyzing module in response to that the average pixel brightness is greater than or equal to the gray level threshold, the panel driving module driving the liquid crystal panel based on the image data, generating a third backlight driving signal based on the gray level information, and serving the third backlight driving signal as the backlight driving signal to output the same;

a backlight driving module, connected to the panel driving module for receiving the backlight driving signal, comprising a pulse width modulation module configured to modulate the backlight driving signal during a display period to form a power supplier for being provided to the backlight module.

2. The liquid crystal display device according to claim 1, wherein the gray level analyzing module comprises an average pixel brightness detecting module and a pixel brightness comparing module, the average pixel brightness detecting module is configured to detect and calculate the average pixel brightness of the image data, the pixel brightness comparing module is configured to store the gray level threshold and compare the average pixel brightness with the gray level threshold.

3. The liquid crystal display device according to claim 2, wherein the average pixel brightness detecting module is configured to obtain the image data and calculate based on gray level histogram analysis to obtain the average pixel brightness.

4. The liquid crystal display device according to claim 1, wherein the convolution operating module is disposed in the panel driving module.

5. The liquid crystal display device according to claim 1, further comprising a gating switch connected to the panel driving module, configured to receive the backlight driving signal, and allow to output the backlight driving signal or forbid to output the backlight driving signal based on an external value received by the gating switch.

6. The liquid crystal display device according to claim 1, further comprising a fuzzy module connected to a gating switch, configured to receive the backlight driving signal in response to that the backlight driving signal is outputted by the gating switch, and adjust the backlight driving signal such that backlight brightness of the liquid crystal display gradually changes to a final backlight brightness value.

7. The liquid crystal display device according to claim 1, wherein the panel driving module is configured to receive the image data from the image data obtaining module, and increase gray level brightness and saturation of the image data based on a ratio to drive the liquid crystal panel or increase gray level brightness of the image data based on the ratio to drive the liquid crystal panel, and the panel driving module generate the backlight driving signal based on the ratio such that the backlight module produces decreasing backlight brightness based on the ratio.

8. A backlight control method for a liquid crystal display device, the liquid crystal display device comprising a liquid crystal panel and a backlight module providing backlight to the liquid crystal panel, the method comprising steps of:

(a) detecting and calculating average pixel brightness of image data and comparing the average pixel brightness with a gray level threshold, obtaining gray level information based on the image data, and obtaining saturation information based on the image data;

(b) in response to that the average pixel brightness is less than the gray level threshold, generating a first backlight driving signal based on the gray level information of the image data and a second backlight driving signal based on the saturation information of the image data;

(c) performing a convolution operation on the first backlight driving signal and the second backlight driving signal to output a backlight driving signal and going to Step (e);

(d) in response to that the average pixel brightness is greater than or equal to the gray level threshold, generating a third backlight driving signal based on gray level information of the image data and outputting the third backlight driving signal as the backlight driving signal and going to Step (e);

(e) modulating the backlight driving signal to form a power supplier provided to the backlight module.

9. The backlight control method according to claim 8, wherein in Step (a), the average pixel brightness is obtained by gray level histogram analysis.

10. The backlight control method according to claim 8, wherein gray level brightness and saturation of the image data increase based on a ratio to drive the liquid crystal panel or the gray level brightness of the image data increase based on the ratio to drive the liquid crystal panel, and the backlight driving signal is modulated in Step (e) based on the ratio such that the backlight module produces decreasing backlight brightness based on the ratio.

11. The backlight control method according to claim 10, wherein the ratio is preset and written to a register, and read out from the register for use in driving the liquid crystal panel.

* * * * *

UNITED STATES PATENT AND TRADEMARK OFFICE
CERTIFICATE OF CORRECTION

PATENT NO. : 11,143,908 B2
APPLICATION NO. : 16/493329
DATED : October 12, 2021
INVENTOR(S) : Qingcheng Zuo Page 1 of 1

It is certified that error appears in the above-identified patent and that said Letters Patent is hereby corrected as shown below:

On the Title Page

Insert the following:
Item (30) Foreign Application Priority Data
-- Oct. 30, 2018 (CN)...................... 201811278852.1 --

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*